J. E. WEBSTER.
GEAR SHIFTING MECHANISM.
APPLICATION FILED MAY 25, 1914. RENEWED OCT. 14, 1918.

1,363,700.

Patented Dec. 28, 1920.

3 SHEETS—SHEET 1.

WITNESSES:

INVENTOR
John E. Webster
BY
Wesley G. Carr
ATTORNEY

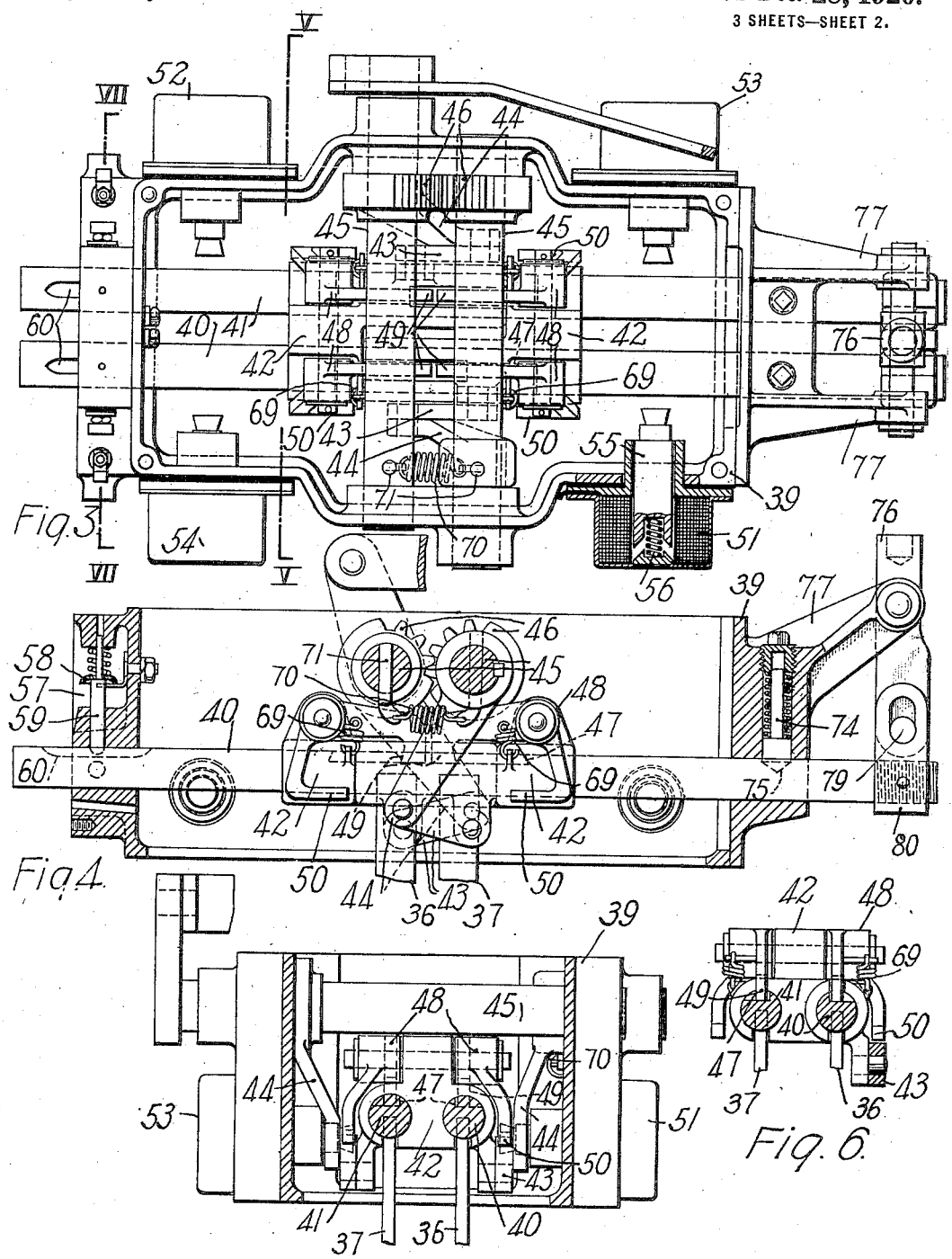

UNITED STATES PATENT OFFICE.

JOHN E. WEBSTER, OF PITTSBURGH, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,363,700. Specification of Letters Patent. Patented Dec. 28, 1920.

Application filed May 25, 1914, Serial No. 840,655. Renewed October 14, 1918. Serial No. 258,105.

*To all whom it may concern:*

Be it known that I, JOHN E. WEBSTER, a citizen of the United States, and a resident of Pittsburgh, in the county of Allegheny and State of Pennsylvania, have invented a new and useful Improvement in Gear-Shifting Mechanism, of which the following is a specification.

My invention relates to gear-shifting mechanisms for automobiles or other motor vehicles, and it has particular reference to such mechanisms as are actuated by the usual clutch pedal and are controlled by selective devices.

My invention has for its object to provide a device of the above indicated character that is adapted to be applied directly to the transmission mechanism of motor vehicles.

A second object of my invention is to provide an arrangement which operates to positively prevent the shifting of any of the transmission gear wheels to an operative position when the selective mechanism is adjusted for the neutral position of the transmission mechanism.

A number of devices of the same general character as that of my invention have hitherto been proposed but a serious disadvantage possessed by many of them is the necessity for intermediate mechanism to connect them to the transmission mechanism. A further disadvantage possessed by many of such devices is that, when the selective mechanism is adjusted for the neutral position of the transmission mechanism, the actuating mechanism does not engage the shifted members when the several gear wheels have been brought to the neutral position and, consequently, they are not positively prevented from movement beyond the neutral position because of their inertia or other causes.

I provide a shifting mechanism which may be located upon the casing or housing of the transmission mechanism and which may be directly connected to the shiftable gear wheels without the employment of auxiliary connecting devices. If the selective mechanism is adjusted for the neutral position of the shiftable gear wheels, the latter are locked in that position when the actuating mechanism has operated to bring any gear wheel that may have been shifted, to such position.

Figure 1:
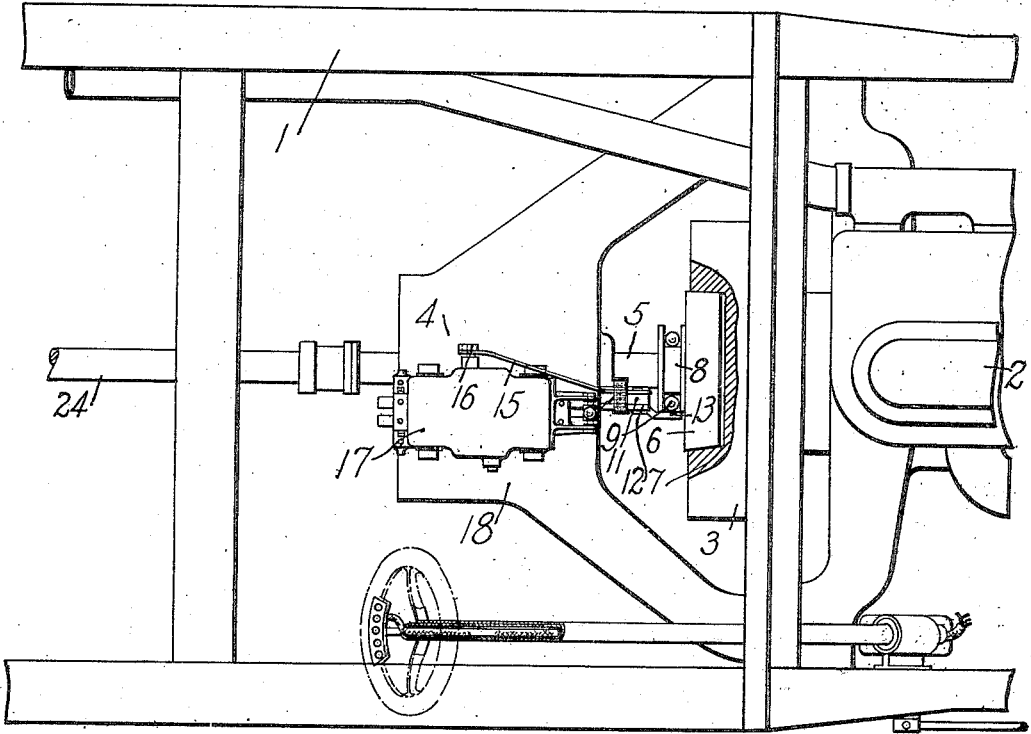
Figure 2:
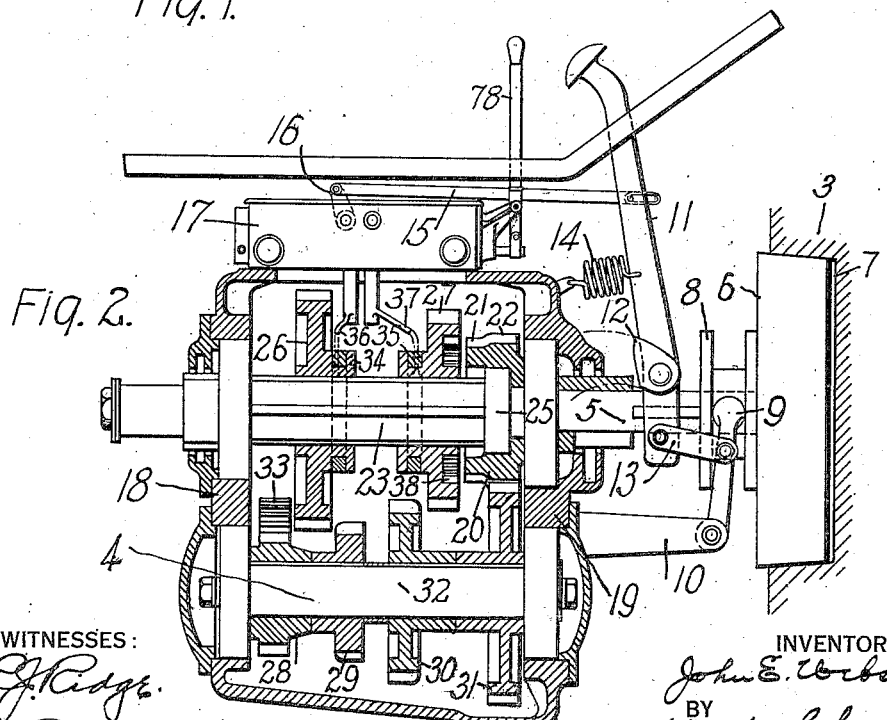
Figure 7:
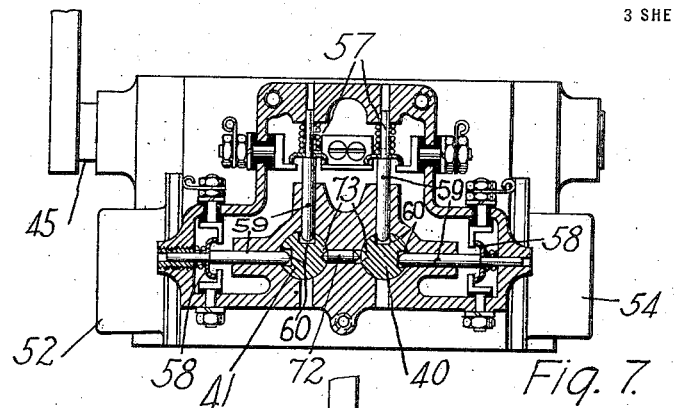
Figure 8:
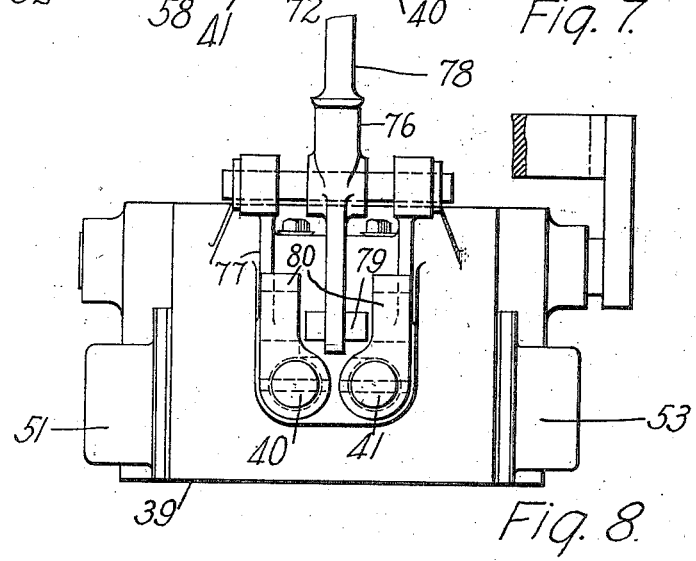
Figure 9:
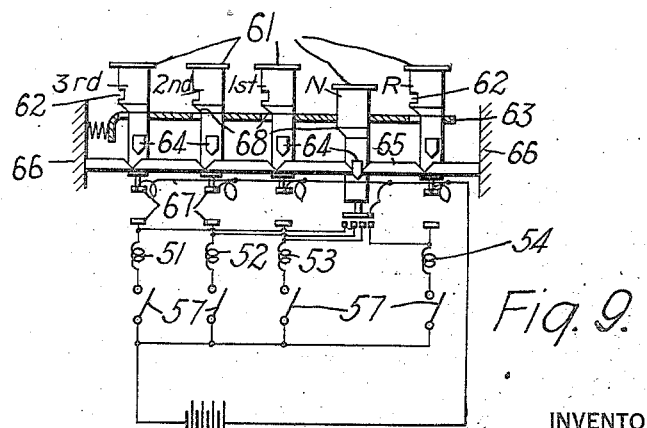

My invention may be best understood when described in connection with the accompanying drawings in which Figure 1 is a view, partially in plan and partially in section, of a portion of an automobile with my invention attached thereto. Fig. 2 is a view, partially in elevation and partially in section, of the transmission mechanism of an automobile and its related parts. Fig. 3 is a view, partially in plan and partially in section, of the gear-shifting mechanism. Fig. 4 is a view, in longitudinal section, of the mechanism shown in Fig. 3. Fig. 5 is a view, in transverse section, on line V—V of Fig. 3. Fig. 6 is a view, partially in elevation and partially in section, of certain details. Fig. 7 is a view, in section, on line VII—VII of Fig. 3. Fig. 8 is an end view, in elevation, of the gear-shifting mechanism. Fig. 9 is a diagrammatic view of the electrical circuits employed in connection with my invention and of the mechanism for controlling a set of push buttons that control the circuits.

Referring particularly to Figs. 1 and 2, an automobile chassis 1, only a portion of which is shown, is provided with a gas engine 2 having a fly wheel 3. A transmission mechanism or change-speed gear mechanism 4 is connected to the engine 2 by a shaft 5 and a conical clutch member 6 that is slidably mounted on the shaft 5 to coact with a correspondingly shaped clutch member 7 formed in the fly wheel 3. The clutch member 6 is provided with an integral grooved collar 8 to be engaged by a yoke member 9 that has a pivotal support upon a bracket 10. A pedal lever 11, that is adapted to be operated by the foot of the operator, has a pivotal support upon a lug 12 and is connected by a link 13 to the yoke member 9. A spring 14, that is attached at one end to a suitable stationary part, normally retains the clutch pedal lever 11 in its rearward position, with the clutch member 6 engaging the clutch member 7 in the fly wheel 3. A link 15 connects the pedal lever 11 to a lever arm 16 of a gear-shifting mechanism 17 that is mounted upon the casing 18 of the transmission mechanism.

The transmission mechanism 4 forms no part of my invention but is so combined therewith that a description thereof is desirable in order to explain the operation of the gear-shifting mechanism. The shaft 5, which is connected to the clutch member 6, extends into the transmission casing 18 through an end wall 19 and has a bearing therein. A gear wheel 20, having two sets of gear teeth 21 and 22, is mounted upon the shaft 5 within the casing 18. A transmission shaft 23, which is connected to the main transmission shaft 24, is in axial alinement with the shaft 5 and has a bearing at 25 within the gear wheel 20. The shaft 23 is adapted to be connected to the shaft 5 at different speed ratios by means of two gear wheels 26 and 27 that are slidably keyed upon the shaft 23, gear wheels 28, 29, 30 and 31, that are fixed upon a counter shaft 32, and an idler gear wheel 33 that is in mesh with the gear wheel 28.

The gear wheel 31 is always in mesh with the gear teeth 22 to establish a fixed speed ratio between the shafts 5 and 32. The mechanism is arranged to provide three speeds in the forward and one in the reverse direction. The changes in speed ratio are controlled by the slidable gear wheels 26 and 27 which are respectively provided with integral grooved collars 34 and 35 to be engaged by yoke members 36 and 37. The yoke members 36 and 37 are controlled by the gear-shifting mechanism, as will be later described.

When the gear wheel 26 is in mesh with the gear wheel 29, the mechanism is in its first or low-speed position and the shaft 5 is connected through the gear teeth 22, gear wheel 31, counter shaft 32 and gear wheels 29 and 26 to the transmission shaft 23. For the second, or intermediate speed, the gear wheel 27 is shifted into mesh with the gear wheel 30. For the third, or high, speed, the gear wheel 27 is shifted to the right until internal gear teeth 38, with which the gear wheel 27 is provided, mesh with the gear teeth 21. The shaft 5 is then directly connected to the transmission shaft 23 and the latter is driven at engine speed. For driving in the reverse direction, the gear wheel 26 is shifted into mesh with the idler gear wheel 33, which is always in mesh with the gear wheel 28. The transmission mechanism is illustrated in its neutral or inoperative position in which the shaft 23 is not connected to the counter shaft 32.

Referring now to Figs. 3 to 8, inclusive, the gear-shifting mechanism comprises a housing or casing 39 and two shift rods 40 and 41 which have a slidable bearing in the end walls of the casing and upon which the yoke members 36 and 37 are respectively mounted. Two block members 42, which are slidably mounted upon the shift rods 40 and 41, are connected by links 43 to lever arms 44 that are carried by rock shafts 45. The rock shafts 45, one of which carries the lever arm 16, are operatively connected by gear segments 46. An actuation of the pedal lever 11 beyond its clutch-disengaging position operates, through the connected mechanism just described, to actuate the blocks 42 in opposite directions simultaneously.

Each of the shift rods 40 and 41 is provided with a longitudinal groove 47. Four dogs 48, that are pivotally mounted on opposite sides of the blocks 42, are each provided, at one end, with a hook portion 49 for engaging the respective shift rods 40 and 41. Each of the dogs 48 is provided, at its opposite end, with a horizontally extending portion 50. Normally, the dogs 48 are retained, by springs 69, in the positions shown in Fig. 4, with the hook portions 49 resting upon the bottoms of the grooves 47.

Four electromagnets 51, 52, 53 and 54 are respectively mounted upon the exterior of the side walls of the casing 39 and adjacent to the corners of it. Each electromagnet comprises a movable core member 55 that projects into the casing 39 and is normally held in its extended position in the path of movement of the corresponding dog 48, by a spring 56. When the windings of the several magnets are energized, the core members are withdrawn from the path of movement of the dogs 48.

Referring particularly to Fig. 7, and incidentally to Figs. 3 and 4, each of four self-closing limit switches 57, that are mounted upon an end wall of the casing 39, comprises a movable member 58 having a pin 59 to project into a groove 60 in the shift rod 40 or the rod 41, as the case may be. Each pin 59 is actuated to open its corresponding switch by an inclined portion of the groove 60, when the shift rod has reached the limit of its endwise movement. The grooves 60 are so arranged along the shift rods 40 and 41 that the circuit of the electromagnet that has been energized to cause the shifting of one of the rods 40 and 41, is always broken by the corresponding limit switch, at the end of the movement of the said rod, to cause the meshing of the transmission gear wheels.

The electrical circuits for controlling the gear-shifting mechanism are illustrated in Fig. 9. The electrical connections comprise five parallel circuits each of which is controlled by push buttons 61. The several push buttons 61 are respectively designated, according to the speed ratio which they control, by 3rd, 2nd, 1st, N (neutral) and R (reverse). The several push buttons are so interlocked that only one button can close its corresponding circuit at one time, and this one remains closed until it is released by the actuation of another button. The neutral button is arranged to open as soon as released after actuation. The coils of the several magnets 51, 52, 53 and 54 are in series with the push buttons 61 for 3rd, 2nd and 1st speeds and for reverse movement, respectively, and with the corresponding limit switches 57. The neutral button is arranged in series with each of the magnet coils and, consequently, when it is depressed, all of the magnets are energized to retract their respective core members.

The means employed to interlock the push buttons forms no part of my invention, but a brief description of the same is desirable in order to explain the operation of my invention. Each push button, except the neutral button, is provided with a notch 62 to be engaged by a spring-pressed slidable member 63 when the button has been sufficiently depressed. The several push buttons are provided with lugs 64 that are wedge-shaped, at one end, for insertion between the ends of bars 65 that are slidably mounted between stationary members 66. The distance between the stationary members 66 is equal to the sum of the lengths of the several bars 65 and the width of one of the lugs 64, thereby insuring that only one of the push buttons may be depressed at one time. When one of the buttons is depressed, the lug 64 is inserted between the ends of the corresponding bars 65, and the notch 62 is engaged by the member 63 to lock it in its depressed position, with the corresponding contact members 67 engaged to close one of the parallel circuits. When it is desired to close a second circuit, the corresponding button is depressed, and the member 63 is engaged by the inclined surface 68 and thereby shifted to the left, as shown, to release the first button before the lug 64 of the second button has engaged the bars 65. The neutral button, which is not provided with a groove, operates to release any other button which may have been locked in its depressed position.

It may be assumed that the transmission gear mechanism is in its neutral position, as illustrated in Fig. 2, and that the gear-shifting mechanism is in its corresponding normal or neutral position, as shown in Figs. 3 and 4. It may be assumed, also, that the engine has been started and that the engine clutch members 6 and 7 are disengaged. It is desirable to start the vehicle on first speed, and the push button designated by 1st is accordingly pressed to close a circuit extending from the battery through the first speed button, coil of electromagnet 53 and limit switch 57 to the battery. The electromagnet 53 is energized to retract its core member 55 from the path of movement of the corresponding dog 48. The clutch pedal 11, which, at the time of starting the engine, is in such position that the engine clutch members 6 and 7 are out of engagement, is then pressed forwardly to actuate the link 15, with which it has a lost motion connection, for permitting the usual manipulation of the clutch without actuating the gear-shifting mechanism.

The lever arm 16 accordingly operates through the rock shafts 45, gear segments 46, lever arms 44 and links 43 to slide the blocks 42 in opposite directions simultaneously. When the hook portions 49 of the dogs 48 approach the ends of the grooves 47, the dogs 48, with the exception of that one coacting with the electromagnet 53, engage the corresponding stops constituted by the core members 55, and the dogs are rocked about their pivots to raise the hook portions 49 from the grooves 47. Further movement of the blocks causes the dog that is not rocked to engage the rod 40 and move it to the right (Figs. 3 and 4) to mesh the gear wheel 26 with the gear wheel 29.

When the gear wheels 26 and 29 are fully meshed, the corresponding limit switch will have been opened by the groove 60 and the pin 59 to break the circuit of the magnet 51. The horizontal portion 50 of the dog 48 prevents the core member 55 of the magnet 53 from returning to its normal position until the dog has been removed from its path of movement. The operator then permits the spring 14 to retract the pedal lever 11. A spring 70, that is attached to arms 71 on the shafts 45, operates to return the blocks 42 and the connected parts to their respective normal positions. The springs 69 draw the several dogs downwardly as soon as the hook portions 49 have passed the ends of the grooves 47. The engine clutch is still disconnected when the various parts are in their respective normal positions. Further return movement of the clutch lever 11, permitted by the lost motion connection with the link 15, effects the engagement of the engine clutch, and the vehicle will be driven at first speed through the connections above described.

The circuit controlled by the first-speed button will remain open until another button has been pressed and the gear wheels shifted from the first-speed position. The limit switch 57 will remain open until the shift rod 40 has been returned to permit the end of the pin 58 to again rest upon the bottom of the groove 60. It is impossible, therefore, to produce any change in position of the shiftable gear wheels before a button, other than the first-speed button has been pressed. Any material movement of the clutch lever 11 beyond the clutch-disengaging position simply serves to cause all of the dogs to be rocked by the corresponding stops 55 and, as a result, no movement of the rods 40 and 41 can occur.

When it is desired to change the speed ratio, as, for example, to second speed, the button indicated by 2nd may be pressed at any time desired in advance of the actual change. The electromagnet 52 will be energized to perform the same function as described in connection with the electromagnet 51, when the first-speed button was closed. To effect change to the desired speed, the operator presses the pedal lever 11 to disengage the engine clutch. The rod 41 is in its shifted position, and the left end of the groove 47 is near the coacting hook portion 49 of the adjacent dog 48, so that a slight outward movement of the latter member will effect an engagement of these parts. The further actuation of the pedal lever 11, after the clutch is disengaged, accordingly operates to shift the rod 41 to its neutral position. At this point, all of the dogs 48, except that one controlled by the electromagnet 52, have engaged the corresponding stops 55 and are rocked out of engagement with the respective shift rods 40 and 41. But, since the electromagnet 52 is energized to withdraw its core member 55, the coacting dog is still in opertive position, and the further movement of the clutch lever 11 causes the rod 41 to be shifted to the left, and the gear wheel 27 is shifted into mesh with the gear wheel 30. The corresponding limit switch 57 is then open and the electromagnet 52 is deënergized. The return of the pedal lever 11 operates first to permit the various parts to assume their normal positions and then to effect the engagement of the engine clutch, whereupon the vehicle will be driven at second speed.

In the same manner, changes may be made to third speed, or the direction of drive reversed, by actuating the appropriate push buttons. It will, of course, be understood that, in order to reverse the direction of the vehicle, it is necessary to bring it to a stop before the clutch is engaged.

When it is desired to return either of the shiftable gear wheels 26 and 27 to the neutral position, the neutral button is pressed to energize the electromagnets 51, 52, 53 and 54. The clutch is disengaged as before, and the blocks 42 are shifted outwardly. The shifted rod is in a position to be engaged immediately by the appropriate dog 48 to return it to its neutral position. When the several dogs reach the ends of the grooves 47, further movement is impossible, since all of the stop members 55 have been withdrawn from the path of movement of the dogs 48, and they tend to shift each of the rods in opposite directions. The rods 40 and 41 are thus positively prevented from moving past the neutral position when the neutral button is depressed.

In order to prevent the shifting of one of the rods 40 and 41 when the other rod is out of its neutral position, an interlocking device is provided. As shown in Fig. 7, the interlocking device comprises a pin or rod 72 and notches or recesses 73 in the rods 40 and 41. The pin 72 is of such a length that, when one of the rods is shifted, the pin is forced into the notch 73 of the other rod, and the latter cannot be shifted until the shifted rod has returned to its neutral position.

Each of the rods 40 and 41 is yieldingly held in its neutral position by an accentuating device (Fig. 4) which comprises a spring pressed pin 74 and a notch 75 in the corresponding rod (only one pin and its coacting notch being shown).

An emergency lever 76, which may be omitted, if desired, is pivotally and slidably supported upon lugs 77 that are integral with the casing 39. The lever 76 is provided with a removable handle 78. The lower end of the lever 76 is provided with a pin 79 which is adapted to coact with the one or the other of a pair of apertured lugs 80 that are respectively fixed on the rods 40 and 41, according to the position of the lever 76.

The advantages of my invention are that it may be directly applied to the transmission mechanism of a motor vehicle without the employment of intermediate mechanism. When it is desired to bring the mechanism to the neutral position, it is positively prevented from being shifted into any other position by inadvertence or accident. The location of the electromagnets upon the exterior of the casing prevents oil that may enter the casing, from entering the structure of the electromagnets.

I claim as my invention:

1. In a gear-shifting mechanism, the combination with a shiftable member, of means for actuating said member in opposite directions from a neutral position, and means for selectively causing said actuating means to positively prevent the shiftable member from moving beyond its neutral position, under predetermined conditions.

2. In a gear-shifting mechanism, the combination with a shiftable member, of means for shifting said member in opposite directions from a neutral position, and means for selectively controlling said actuating means, said controlling means operating, when in one position, to cause said actuating means to positively prevent the actuation of said member beyond its neutral position.

3. In a gear-shifting mechanism, the combination with a shiftable member, of means for actuating said member in opposite directions from a neutral position, said means comprising the usual clutch lever, a movable member having a lost-motion connection therewith, a pair of segmental gear wheels connected to said movable member, and a pair of elements connected to said gear wheels.

4. In a gear-shifting mechanism, the combination with a shiftable member, of means for actuating said member in opposite directions, said means comprising a lever, a pair of segmental gear wheels having a lost-motion connection therewith, a longitudinally movable member permanently operatively connected to said gear wheels, and means for controlling said actuating means.

5. In a gear-shifting mechanism, the combination with a shiftable member, and means for actuating said member in opposite directions from a neutral position, of means for selectively controlling said actuating means to exert force upon said member in either of said directions or in both directions simultaneously.

6. In a gear-shifting mechanism, the combination with a shiftable member, and means for actuating said member in opposite directions from a neutral position, said means comprising a pair of members slidable in opposite directions simultaneously, of means for selectively connecting either or both of said slidable members to said shiftable member.

7. In a gear-shifting mechanism, the combination with a shiftable member, and means for actuating said member in opposite directions, of means for selectively controlling said actuating means, said controlling means comprising devices for producing movement in either of said directions and a device tending to produce movement in both directions simultaneously.

8. In a gear-shifting mechanism, the combination with a shiftable member, and means for actuating said member in opposite directions, of means for selectively controlling said actuating means, said controlling means comprising a pair of electrical circuits that are respectively energized to produce movement of said member in said directions, and means for energizing both of said circuits simultaneously.

9. In a gear-shifting mechanism, the combination with a shiftable member, and means for actuating said member in opposite directions, of means for selectively controlling said actuating means, said controlling means comprising a pair of push buttons corresponding to said directions and a push button having the functions of said pair of push buttons simultaneously.

10. In a gear-shifting mechanism, the combination with a plurality of shiftable gear wheels, and means for shifting said gear wheels in opposite directions to produce various speed ratios, of means for selectively controlling said actuating means, said controlling means comprising an electrical circuit corresponding to each of said speed ratios and to a neutral position, a push button in each of said circuits, the neutral push button operating to control all of said circuits simultaneously.

11. In a gear-shifting mechanism, the combination with a shiftable member, of controlling means therefor comprising a manually operable member, a longitudinally movable member, and a pair of coacting gear wheels for permanently operatively connecting said manually operable member to said longitudinally movable member.

12. In a gear-shifting mechanism, the combination with a shiftable member, of controlling means therefor comprising a longitudinally movable member, an actuating member, and a pair of coacting gear wheels permanently operatively connected to said actuating member and to said longitudinally movable member.

13. In a gear-shifting mechanism, the combination with a shiftable member, of controlling means therefor comprising a longitudinally movable member, a pair of rotatable shafts permanently connected thereto and mounted in fixed bearings, and means for rotating said shafts in opposite directions simultaneously.

In testimony whereof, I have hereunto subscribed my name this 19th day of May, 1914.

JOHN E. WEBSTER.

Witnesses:
A. B. KAIGHIN,
B. B. HINES.